(12) United States Patent
Hasegawa et al.

(10) Patent No.: US 10,331,622 B2
(45) Date of Patent: Jun. 25, 2019

(54) INFORMATION MANAGEMENT

(71) Applicant: International Business Machines Corporation, Armonk, NY (US)

(72) Inventors: Tohru Hasegawa, Tokyo (JP); Masayuki Iwanaga, Urayasu-si (JP); Yutaka Oishi, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 14/849,633

(22) Filed: Sep. 10, 2015

(65) Prior Publication Data
US 2016/0140118 A1   May 19, 2016

(30) Foreign Application Priority Data

Nov. 19, 2014 (JP) ................................ 2014-234744

(51) Int. Cl.
*G06F 16/00* (2019.01)
*G06F 16/16* (2019.01)
*G06F 16/11* (2019.01)

(52) U.S. Cl.
CPC .......... *G06F 16/164* (2019.01); *G06F 16/122* (2019.01)

(58) Field of Classification Search
CPC ......... G06F 17/30174; G06F 17/30575; G06F 17/3012; G06F 17/30221; G06F 17/30309; G06F 3/065; G06F 3/0647; G06F 11/1461; G06F 11/1469
See application file for complete search history.

(56) References Cited

U.S. PATENT DOCUMENTS

| | | | | |
|---|---|---|---|---|
| 6,553,391 B1* | 4/2003 | Goldring | ............ | G06F 17/30174 |
| 7,146,377 B2* | 12/2006 | Nowicki | ............ | G06F 17/30067 |
| 8,655,848 B1* | 2/2014 | Leverett | ............ | G06F 17/30088 |
| | | | | 707/660 |

(Continued)

FOREIGN PATENT DOCUMENTS

| | | |
|---|---|---|
| JP | 2003516582 A | 5/2003 |
| JP | 2003173279 A | 6/2003 |

(Continued)

OTHER PUBLICATIONS

Patent Application No. 2014-234744, Decision to Grant a Patent, Date of Drafting: Sep. 26, 2013, 3 pages.

(Continued)

*Primary Examiner* — Augustine K. Obisesan
(74) *Attorney, Agent, or Firm* — Peter J. Edwards

(57) ABSTRACT

Managing metadata added to a file, a directory, or a symbolic link is provided. One or more pieces of metadata of a movement target are obtained. The movement target is at least one of a file, a directory, and a symbolic link. The movement target is to be moved from one file system to another file system within a plurality of file systems. Whether the one or more pieces of metadata are migratable to the other file system is determined based, at least in part, on metadata stored in the other file system. The one or more pieces of metadata are processed by (i) migrating a first piece of metadata that is determined to be migratable to the other file system and (ii) leaving a second piece of metadata in the one file system, wherein the second piece of metadata is determined to be non-migratable.

11 Claims, 6 Drawing Sheets

(56) References Cited

U.S. PATENT DOCUMENTS

| | | | |
|---|---|---|---|
| 8,984,027 B1* | 3/2015 | Patwardhan | G06F 17/30079 |
| | | | 707/809 |
| 9,244,958 B1 | 1/2016 | MacCanti et al. | |
| 2002/0188667 A1 | 12/2002 | Kimos | |
| 2005/0203976 A1 | 9/2005 | Hyun et al. | |
| 2006/0112096 A1* | 5/2006 | Ahluwalia | G06F 17/30079 |
| 2009/0006468 A1 | 1/2009 | Shankar et al. | |
| 2009/0228462 A1 | 9/2009 | Frieder et al. | |
| 2010/0306180 A1 | 12/2010 | Johnson et al. | |
| 2011/0040729 A1 | 2/2011 | Ito et al. | |
| 2012/0084529 A1* | 4/2012 | Nonaka | G06F 3/0607 |
| | | | 711/165 |
| 2012/0109923 A1 | 5/2012 | Pasquero et al. | |
| 2013/0054523 A1* | 2/2013 | Anglin | G06F 17/30575 |
| | | | 707/624 |
| 2013/0085989 A1* | 4/2013 | Nayyar | G06F 17/30079 |
| | | | 707/610 |
| 2013/0183649 A1 | 7/2013 | Monroe et al. | |
| 2014/0229513 A1 | 8/2014 | Shiell et al. | |
| 2014/0351256 A1 | 11/2014 | Gluck et al. | |
| 2014/0379646 A1* | 12/2014 | Romotoski | G06F 11/2094 |
| | | | 707/624 |
| 2015/0046463 A1 | 2/2015 | Mohan | |
| 2015/0120672 A1* | 4/2015 | Joglekar | G06F 17/30073 |
| | | | 707/667 |
| 2016/0253398 A1* | 9/2016 | Jothivelavan | G06F 17/30212 |
| 2016/0321338 A1* | 11/2016 | Isherwood | G06F 17/30575 |

FOREIGN PATENT DOCUMENTS

| | | |
|---|---|---|
| JP | 2005078612 A | 3/2005 |
| JP | 2010257094 A | 11/2010 |
| JP | 2012068891 A | 4/2012 |
| JP | 2012069161 A | 4/2012 |
| JP | 2014515840 A | 7/2014 |
| WO | 2006131978 A1 | 12/2006 |

OTHER PUBLICATIONS

Hasegawa et al., "Information Management", U.S. Appl. No. 15/410,938, filed Jan. 20, 2017.

IBM, List of IBM Patents or Patent Applications Treated as Related, Jan. 19, 2017, 2 pages.

"Information Management System, Information Management Method, and Program Product", Japan application No. 2014-234744, filed on Nov. 19, 2014, pp. 1-35.

* cited by examiner

INFORMATION MANAGEMENT

TECHNICAL FIELD

The present invention relates to information management, and more specifically to managing metadata that is added to a file or the like.

BACKGROUND OF THE INVENTION

Hierarchical storage management (HSM) is a technique for managing files in appropriate storage devices (storage units) in accordance with a predetermined rule (policy). HSM is a technique in which a plurality of storage units, such as an SSD (Solid State Drive), an HDD (Hard Disk Drive), and a magnetic tape medium (tape medium), for example, are arranged into a hierarchy, and data is moved within the hierarchy on a per file basis.

In HSM, a file on a higher level, such as a file on an HDD, for example, is moved to a lower level, such as a tape medium, in accordance with access frequency and file type when storage usage exceeds a threshold, for example.

SUMMARY

According to one embodiment of the present invention, a method for managing metadata added to a file, a directory, or a symbolic link is provided. The method includes: obtaining, by one or more processors, one or more pieces of metadata of a movement target, wherein the movement target is at least one of a file, a directory, and a symbolic link, and wherein the movement target is to be moved from one file system to another file system within a plurality of file systems; determining whether the one or more pieces of metadata are migratable to the other file system based, at least in part, on metadata stored in the other file system; and processing the one or more pieces of metadata by (i) migrating a first piece of metadata that is determined to be migratable to the other file system and (ii) leaving a second piece of metadata in the one file system, wherein the second piece of metadata is determined to be non-migratable.

According to another embodiment of the present invention, a computer program product for managing metadata added to a file, a directory, or a symbolic link is provided. The computer program product comprises a computer readable storage medium and program instructions stored on the computer readable storage medium. The program instructions include: program instructions to obtain one or more pieces of metadata of a movement target, wherein the movement target is at least one of a file, a directory, and a symbolic link, and wherein the movement target is to be moved from one file system to another file system within a plurality of file systems; program instructions to determine whether the one or more pieces of metadata are migratable to the other file system based, at least in part, on metadata stored in the other file system; and program instructions to process the one or more pieces of metadata by (i) migrating a first piece of metadata that is determined to be migratable to the other file system and (ii) leaving a second piece of metadata in the one file system, wherein the second piece of metadata is determined to be non-migratable.

According to another embodiment of the present invention, a computer system for managing metadata added to a file, a directory, or a symbolic link is provided. The computer system includes one or more computer processors, one or more computer readable storage media, and program instructions stored on the computer readable storage media for execution by at least one of the one or more processors. The program instructions include: program instructions to obtain one or more pieces of metadata of a movement target, wherein the movement target is at least one of a file, a directory, and a symbolic link, and wherein the movement target is to be moved from one file system to another file system within a plurality of file systems; program instructions to determine whether the one or more pieces of metadata are migratable to the other file system based, at least in part, on metadata stored in the other file system; and program instructions to process the one or more pieces of metadata by (i) migrating a first piece of metadata that is determined to be migratable to the other file system and (ii) leaving a second piece of metadata in the one file system, wherein the second piece of metadata is determined to be non-migratable.

DETAILED DESCRIPTION

Figure 1:
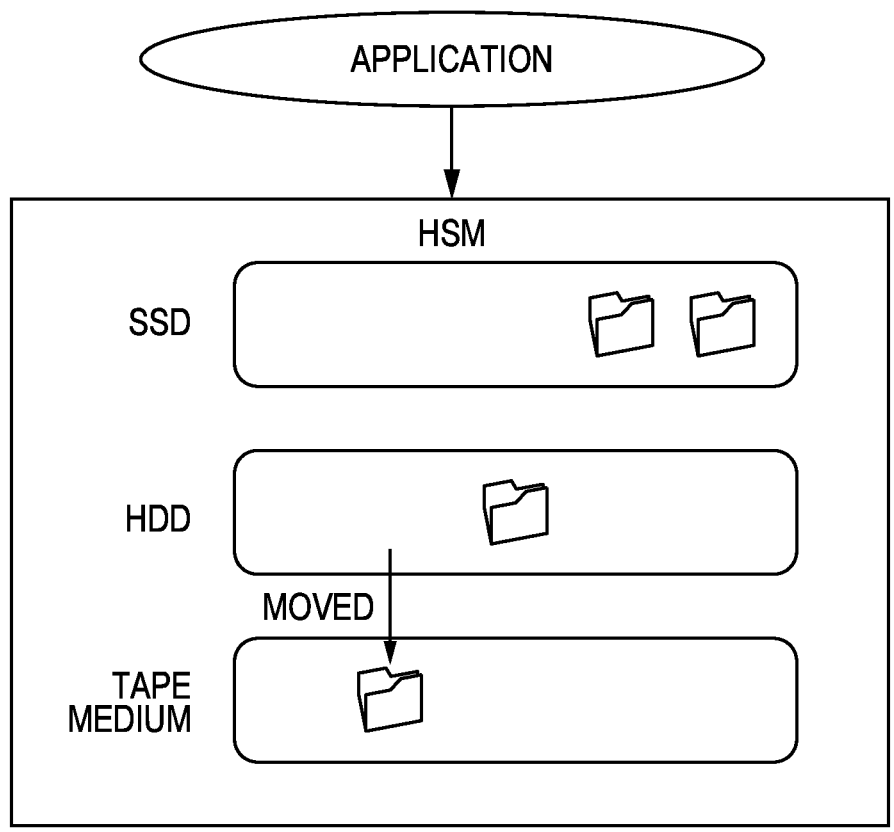
FIG. 1 is diagram illustrating an example of a configuration of HSM, in accordance with an embodiment of the present invention.

Embodiments of the present invention recognize that, metadata, such as a file name, is used in file management. Two types of methods are available for managing such metadata.

A first one of the two recognized methods is a method of centrally managing metadata by using a database (DB). Metadata of a file that is stored in each storage unit is retained and managed by each file system. In a case where metadata is centrally managed by using a DB, necessary metadata can be managed regardless of the file system. On the other hand, in a case where a failure or the like occurs and the DB is not accessible, a file itself is present but not accessible because the metadata is not available.

The other recognized method is a method of directly using metadata retained by each file system without using a DB. With this method, management using a DB is not necessary, and it is possible to avoid a situation where a file is not accessible because the DB is not accessible. Accordingly, some types of HSM, such as UnionFS and the like, employ this other method.

Embodiments of the present invention recognize that, in HSM, file systems that manage files stored in storage units are not necessarily the same among the storage units, and different file systems are present. Metadata that can be saved in a file system differs depending on the type of file system. Accordingly, some file systems do not support extended attributes (EAs), some file systems differ in the maximum size of EAs, and some file systems are unable to save access rights, for example.

Embodiments of the present invention further recognize that, when a file is moved between such different file systems, if a file system at a higher level is able to save access rights, but a file system at a lower level is unable to save access rights, for example, metadata, namely, information about access rights, is lost.

Embodiments of the present invention provide a system for managing metadata added to a file, a directory, or a symbolic link, the system including: obtaining means for obtaining, in a case of moving at least one of a file, a directory, and a symbolic link, which is a movement target to be moved from one file system to another file system among a plurality of file systems, pieces of metadata of the movement target; determining means for referring to metadata stored in the other file system and determining whether the obtained pieces of metadata are migratable to the other file system; and processing means for, among the obtained pieces of metadata, migrating a piece of metadata that is determined to be migratable to the other file system, and leaving a piece of metadata that is determined to be non-migratable in the one file system.

Some embodiments of the present invention may prevent metadata from being lost when a file or the like is moved.

The present invention will be described with reference to specific embodiments illustrated in the drawings; however, the present invention is not limited to the embodiments described below.

FIG. 1 is diagram illustrating an example of a configuration of HSM, in accordance with an embodiment of the present invention. HSM is a technique in which a plurality of storage units, such as an SSD (Solid State Drive), an HDD (Hard Disk Drive), and a magnetic tape medium (tape medium), as illustrated in the example of FIG. 1, are arranged into a hierarchy, and data is moved within the hierarchy on a per file basis.

Figure 2:
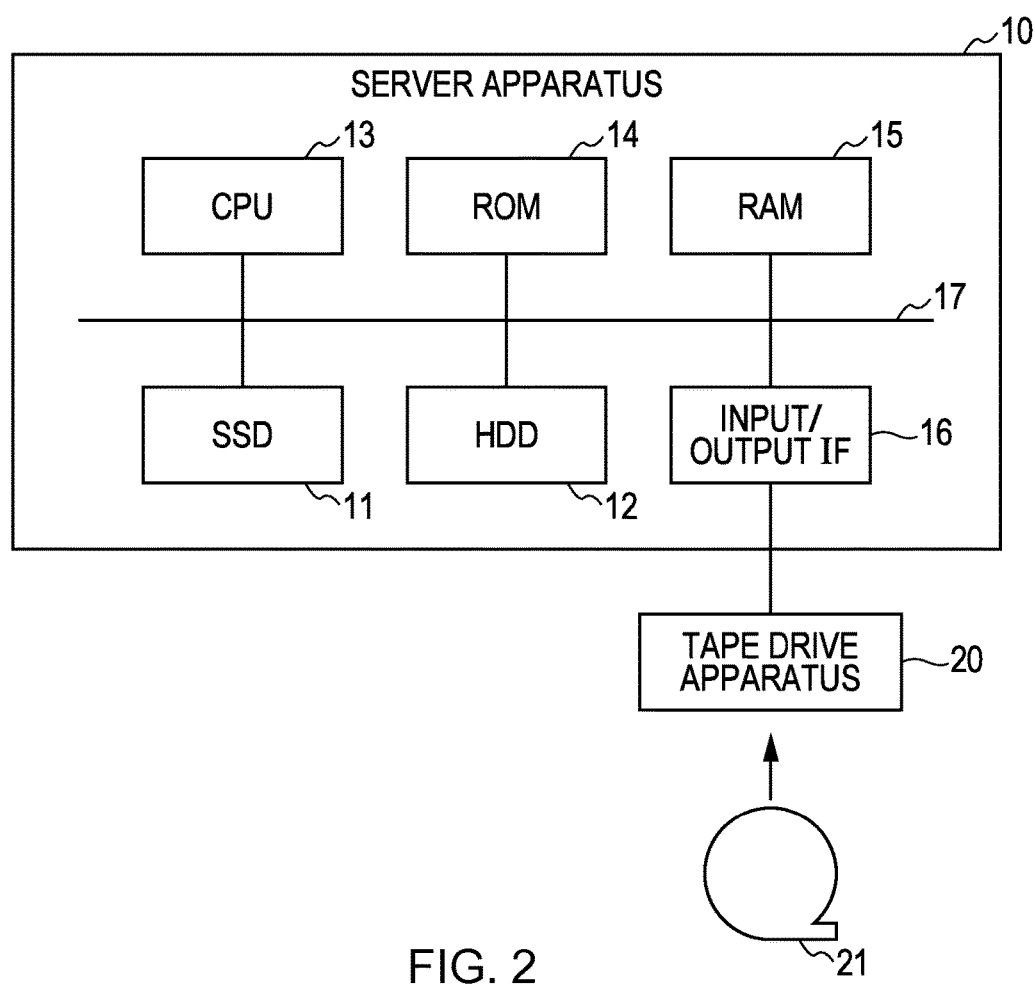
FIG. 2 is a diagram illustrating a system environment to which an information management system for managing metadata of files is applied, in accordance with an embodiment of the present invention.

FIG. 2 is a diagram illustrating a system environment to which an information management system for managing metadata of files is applied. The environment illustrated in FIG. 2 is configured such that an SSD 11 equipped with a flash memory and an HDD 12 equipped with a hard disk are mounted in a server apparatus 10, and a tape drive apparatus 20 that enables reading/writing from/to a tape medium 21 is connected to the server apparatus 10 via a cable, a network, or the like.

FIG. 2 illustrates an environment with three storage units; however, the number of storage units may be two, or four, or more. Both of the SSD 11 and the HDD 12 need not be mounted in the server apparatus 10, and one of the SSD 11 and the HDD 12 may be mounted in the server apparatus 10, and the other may be connected to the server apparatus 10 via a cable or a network.

The server apparatus 10 may be connected to a network to which a client computer used by a user is connected so as to be accessible from the client computer. Note that the network may be any of a LAN, a WAN, the Internet, and the like, and may be a wired network or a wireless network.

In the server apparatus 10, the storage units are arranged into a hierarchy, and files are managed in appropriate storage units. In FIG. 2, the SSD 11, the HDD 12, and the tape medium 21 are arranged into a hierarchy in this order, and files are respectively managed in storage units on appropriate levels. In file management, files are read/written from/to storage units, and are moved within the hierarchy, for example. In order to implement this file management, the server apparatus 10 includes a central processing unit (CPU) 13, a read-only memory (ROM) 14, a random access memory (RAM) 15, and an input/output interface (I/F) 16 as hardware devices in addition to the SSD 11 and the HDD 12. The server apparatus 10 may also include input/output devices, such as a keyboard and a mouse, a display device, such as a display, an audio input device, such as a microphone, an audio output device, such as a speaker, a network I/F, an external storage device I/F, and so on as hardware devices.

The ROM 14 stores a boot program for starting up the server apparatus 10, and firmware for controlling the SSD 11 and so on, for example. The CPU 13 performs overall control of the server apparatus 10 and performs processes by loading a program for performing the above-described management from the SSD 11 or the like to the RAM 15 and executing the program. The CPU 13 may load an operating system (OS), other programs, data, and so on and perform other processes. The program for performing the above-described management may include a program for HSM as described above. The RAM 15 provides a workspace for the CPU 13. The input/output I/F 16 connects the server apparatus 10 with the tape drive apparatus 20 and enables transmission and reception of files between the server apparatus 10 and the tape drive apparatus 20. Note that these hardware devices are connected to one another via a bus 17 and transmit and receive files, information, and so on via the bus 17.

A tape medium is constituted by a tape wound around a reel and a cartridge that houses the tape. The tape drive apparatus 20 has a loading slot for loading the cartridge, and, when the cartridge is loaded into the loading slot, the tape medium is set. The tape drive apparatus 20 reads/writes files from/to the tape medium that is set, in accordance with instructions provided by the CPU 13. The depicted embodiment has one tape drive apparatus 20; however, it is possible to use a tape library that both includes a plurality of tape drive apparatuses 20 and that handles a plurality of tape media. In a case of using a tape library, the tape library is able to perform management and operations of a plurality of tape media, loading of the tape media to the tape drive apparatuses 20, and so on.

The tape drive apparatus 20 may include, for example, an input/output OF that is connected to the input/output I/F 16 and that accepts, from the OS installed on the server apparatus 10, orders which provide instructions for writing/reading files to/from the tape medium 21. The tape drive apparatus 20 may include a memory that stores a file to be written and a file that has been read, a head that actually writes/reads files to/from the tape medium 21, a drive unit that rotates the reel at a certain rotation speed, and a controller that performs overall control of the tape drive apparatus 20.

Unlike the HDD 12, the SSD 11 does not have a disk. and therefore, is able to perform reading/writing at a higher speed than the HDD 12 without the seek time for the read head to move across the disk and the latency due to disk rotation so that the data of interest is aligned with the position of the head. Furthermore, the SSD 11 does not need a motor to rotate a disk, and therefore, the SSD 11 consumes less power than the HDD 12. However, the SSD 11 has a smaller storage capacity than the HDD 12 and is expensive. Although the tape medium 21 is inexpensive, the tape medium 21 is slower for read/write operations than the SSD 11 and the HDD 12, and it is not possible to read a specific portion of the stored content from the tape medium 21 or to write content to a specific portion of the tape medium 21.

On the basis of the above-described characteristics, the server apparatus 10 may store data that is frequently used on the SSD 11 in order to read/write the data at a high speed. The server apparatus 10 may store data that is used less frequently and data that has a large data size, such as video data, on the HDD 12. The server apparatus 10 may store data that is used the least frequently on the tape medium 21. The server apparatus 10 may manage the data. In order to implement such management, for the server apparatus 10, a rule called a policy is defined and set in advance. For example, it is possible to define a policy as a rule wherein a file is moved to a lower level storage device responsive to storage usage on another level exceeding a threshold, for example, in accordance with access frequency and file type. This policy is merely an example, and other policies may be defined and set.

A file includes data, such as text data, image data, and video data, and metadata that describes the data. Examples of metadata include: the name of the file, the size of the file, the date and time of creation of the file, the date and time of an update of the file, the name of a file creator, the data format, the file type, the path, the physical location of the file, access rights, extended attributes (EAs), and so on. The path is information that describes a route to the file or to the folder. Metadata of a file may include one or more pieces of information, each of which stores one or more pieces of metadata.

EAs may include resource forks and file manager information used in consumer operating systems, for example Mac OS. The term(s) "Mac OS" may be subject to trademark rights in various jurisdictions throughout the world and is used here only in reference to the products or services properly denominated by the marks to the extent that such trademark rights may exist. A resource fork includes information such as information about the shape of an icon or a window, the content and definition of a menu, and so on. File manager information includes information such as information about an application that handles a file, flags that indicate file attributes, and the position and size of information displayed on a screen. The information described above are merely examples and are not restrictive.

Each of the storage units, namely, the SSD 11, the HDD 12, and the tape medium 21, is provided with a file system for managing files stored in the storage unit. The file system retains metadata of files and manages the files using the metadata. The file system differs depending on the storage unit and retains different metadata.

Figure 3:
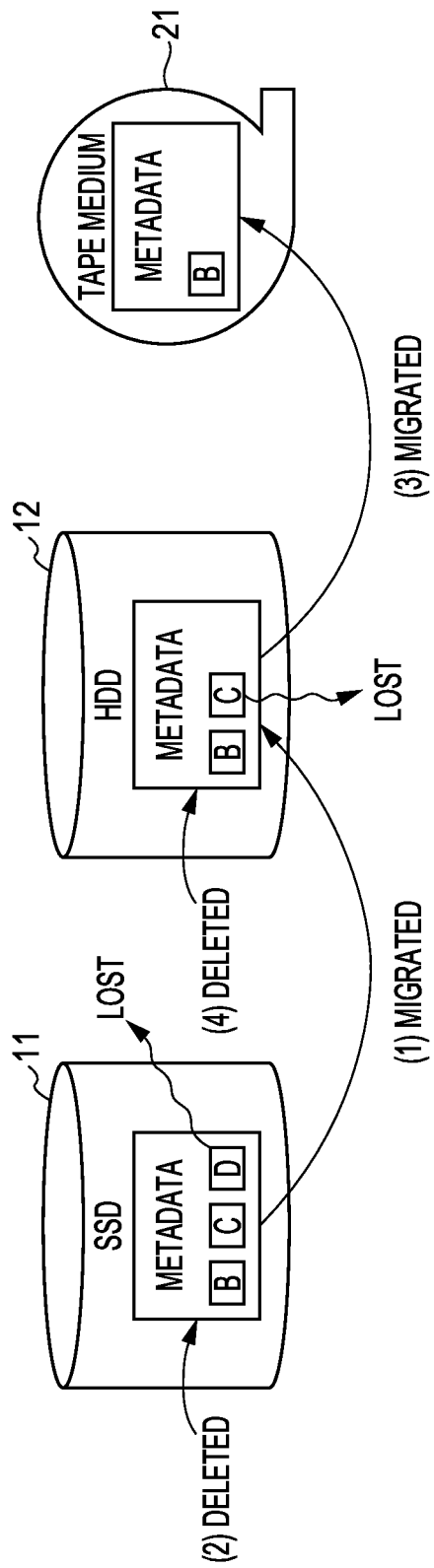
FIG. 3 is a diagram illustrating a loss of metadata, in accordance with an embodiment of the present invention.

FIG. 3 illustrates a case where a file A (not shown) is moved from the SSD 11 to the HDD 12 and is further moved from the HDD 12 to the tape medium 21. Furthermore, it is assumed that the file system of the SSD 11 is able to retain information B, information C, and information D as metadata, the file system of the HDD 12 is able to retain the information B and the information C, and the file system of the tape medium 21 is able to retain only the information B.

As illustrated in FIG. 3, when the file A is moved from the SSD 11 to the HDD 12, the file A is duplicated, data in the duplicated file A is moved, and the piece of information B, the information C, and the information D are migrated as metadata. However, the HDD 12, which is the migration destination, is not configured to retain the information D, and therefore, it is not possible to migrate the information D. The original file A is deleted from the SSD 11 after the movement, and, as a result, the information D is lost. Examples of the information D include a resource fork, as described above.

The same situation arises in a case where the file A is moved from the HDD 12 to the tape medium 21. Although an attempt is made to move data in the file A and to migrate the information B and the information C as metadata, it is not possible to migrate the information C. The original file A is deleted from the HDD 12 after the movement. As a result, the information C is lost. Examples of the information C include information about access rights. Examples of the information B include information that is typically used as metadata, such as the name of the file, the size of the file, the creation date/time, the update date/time, and so on.

A description is given of an information management system 30 that prevents metadata from being lost as described above, with reference to FIG. 4. The information management system 30 may be mounted in the server apparatus 10 illustrated in FIG. 2 or may be constituted by another apparatus, or by the server apparatus 10 and another apparatus. The information management system 30 includes an obtaining unit 31, a determining unit 32, and a processing unit 33 as functional units. These functional units are implemented by the CPU 13 executing the program described above. Note that, in FIG. 4, only the HDD 12 and the tape medium 21 are illustrated as storage units.

Figure 4:
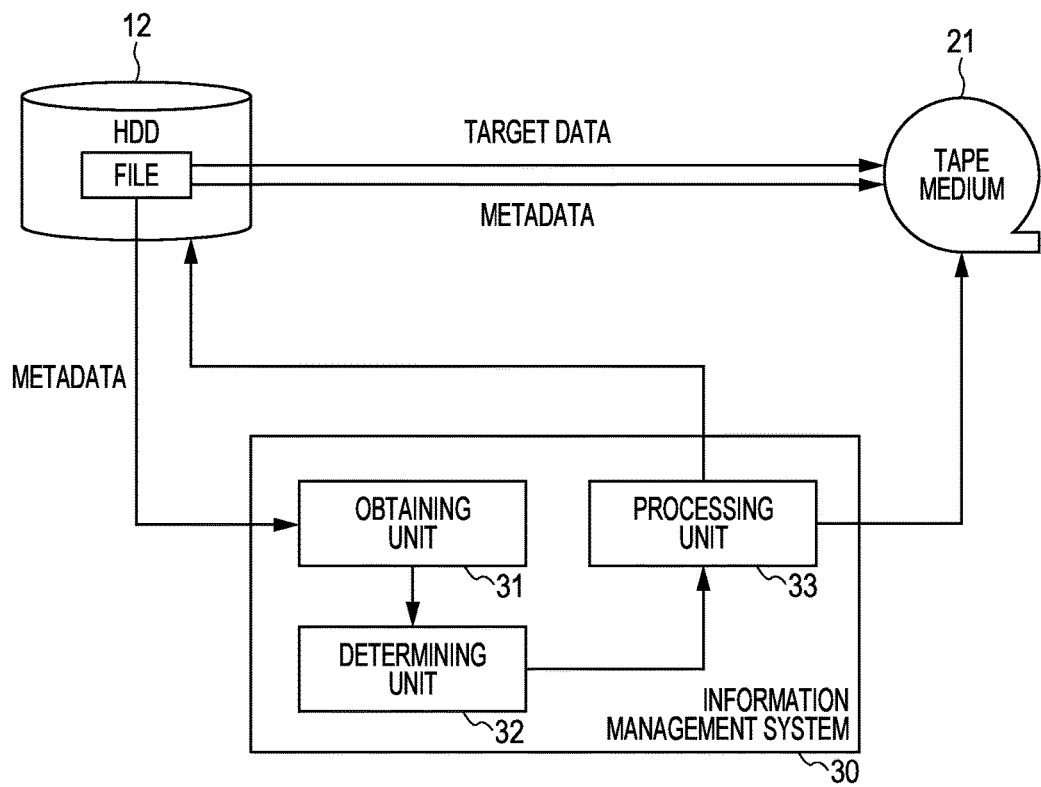
FIG. 4 is a functional block diagram of an information management system, in accordance with an embodiment of the present invention.

FIG. 4 illustrates an example in which a server apparatus (e.g., server apparatus 10 of FIG. 2) is implemented. In this case, when a file is moved from the HDD 12 to the tape medium 21 in accordance with a policy, the obtaining unit 31 obtains metadata of the file. The metadata is the information B and the information C in the example illustrated in FIG. 3. The obtaining unit 31 may make a request for metadata of the file to the file system of the HDD 12 to thereby obtain the metadata from the file system. For example, the obtaining unit 31 may transmit a request specifying a file name to the file system, and the file system may transmit metadata of a file that has the file name to the obtaining unit 31.

The determining unit 32 references metadata retained by the file system of the tape medium 21, which is the movement destination. The metadata is the information B in the example illustrated in FIG. 3. Specifically, the determining unit 32 examines what types of metadata are saved and determines the types of metadata that can be saved. The determining unit 32 determines whether the metadata obtained by the obtaining unit 31 is migratable on the basis of the examined metadata. In this case, it is not possible to save the information C in the file system, and therefore, the determining unit 32 determines that the information B is migratable but the information C is not migratable.

The processing unit 33 migrates the metadata that is determined by the determining unit 32 to be migratable from the file system of the HDD 12 to the file system of the tape medium 21. The processing unit 33 performs a process of deleting the migrated metadata from the file system of the HDD 12. The processing unit 33 does not migrate the metadata that is determined by the determining unit 32 to be non-migratable to the file system of the tape medium 21 and performs a process of leaving the metadata in the file system of the HDD 12. Specifically, the processing unit 33 creates a special file (metafile) that is not visible to a user in the file system, and stores only the metadata that is determined to be non-migratable in the metafile. As a result, the metadata that is not migratable is stored in the metafile and remains undeleted, which prevents the metadata from being lost.

Although the previous example discussed moving a file from the HDD 12 to the tape medium 21, it is possible to move a file from the SSD 11 to the HDD 12 by performing a similar process.

Figure 5:
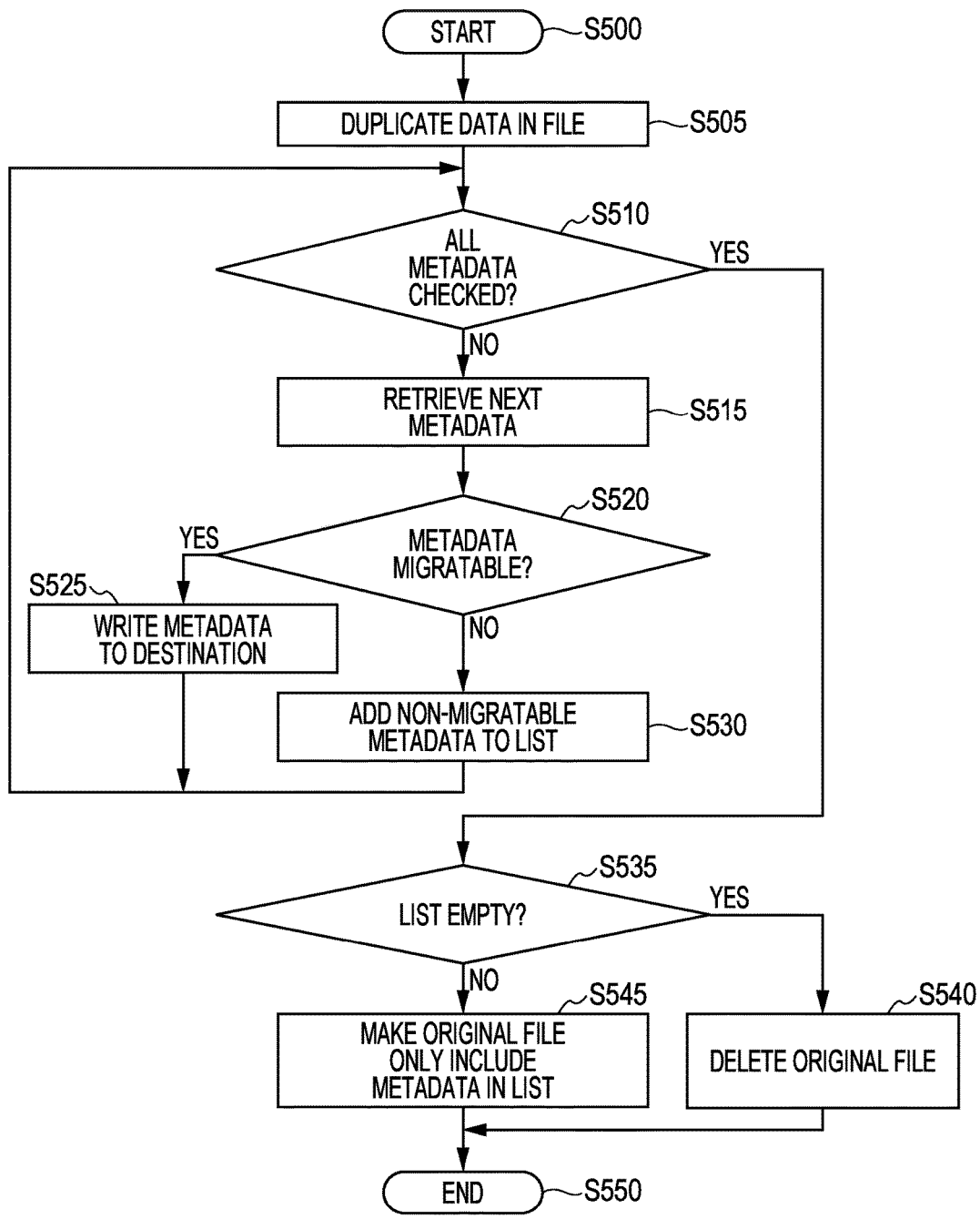
FIG. 5 is a flowchart illustrating a flow of a file moving process performed by an information management system, in accordance with an embodiment of the present invention.

A detailed description of a process performed by the information management system 30 is given with reference to the flowchart illustrated in FIG. 5. The process begins at step S500, responsive to determining that a file is to be moved in the server apparatus 10 in accordance with a policy. In step S505, data in the file to be moved is duplicated. The duplicated data is written (moved) to a destination storage unit. Pieces of metadata in the file are obtained.

In decision S510, it is determined whether all pieces of metadata have been checked to see if the pieces of metadata are migratable to the file system of the destination storage unit. If all pieces of metadata have not been checked (No in decision S510), the flow proceeds to step S515, in which the next piece of metadata is retrieved. In decision S520, it is determined whether the piece of metadata is migratable. Determination as to whether a piece of metadata is migratable can be performed by using the method described above.

If it is determined that the piece of metadata is migratable (Yes in decision S520), the flow proceeds to step S525, in which the piece of metadata is written to the file system of the destination storage unit. From step S525, the flow returns to decision S510. On the other hand, if, in decision S520, it is determined that the piece of metadata is not migratable (No in decision S520), the flow proceeds to step S530 in which the non-migratable piece of metadata is added to a list. From step S530, the flow returns to decision S510. The above steps are repeated, and, if it is determined in decision S510 that all pieces of metadata have been checked (Yes in decision S510), the flow proceeds to decision S535. In decision S535, it is determined whether the list referenced in step S530, that lists non-migratable pieces of metadata, includes no piece of metadata and is empty. If the list is empty (Yes in decision S535), the flow proceeds to step S540 in which the original file (i.e., the file stored in the source storage unit) is deleted. The movement of the file ends in step S550. That is, the file stored in the source storage unit is deleted. Therefore, neither the data in the file nor the metadata of the file remains in the source storage unit.

If the list is not empty (No in decision S535), the flow proceeds to step S545. In step S545, a special metafile is created, based on the list referred to in step S530, wherein only metadata that is not migratable is stored in the metafile; the data in the file and metadata that is migratable are deleted from the source storage unit and from the file system. Thereafter, the flow proceeds to step S550 in which the movement of the file ends.

Note that a metafile may be newly created, or the original file from which the data and any one or more migratable pieces of metadata have been deleted may be used as a metafile. A piece of metadata added to the list may be deleted from the list after the end of the movement of the file in step S550. The list may be created and stored in a memory, such as the RAM 15.

In a case where a plurality of storage units are arranged into a hierarchy to form a hierarchical structure, the file systems of the storage units are also arranged into a hierarchy. In a case where a file is moved from a storage unit on a higher level to a storage unit on a lower level via one or more storage units on middle levels, the determining unit 32 determines whether metadata of the file is migratable to the file system at each level. In a case where a hierarchy consists of three levels, and a file is moved from the highest level to the lowest level, for example, the determining unit 32 determines whether metadata is migratable to the middle level and to the lowest level.

The processing unit 33 stores metadata in the file system at a level one level above a level to which the metadata is determined to be non-migratable. In the case where a hierarchy consists of three levels, and metadata is migrated from the highest level to the lowest level, for example, the processing unit 33 stores, in the file system at the highest level, metadata that is determined to be non-migratable to the file system at the middle level. In this case, the metadata is not migratable to the file system at the middle level, and therefore, remains in the file system at the highest level. The processing unit 33 migrates metadata that is determined to be non-migratable to the file system at the lowest level to the file system at the middle level because the metadata is migratable to the file system at the middle level, and stores the metadata in the file system at the middle level. The processing unit 33 migrates, to the file system at the lowest level, metadata that is determined to be migratable to the file system at the middle level and to the file system at the lowest level, and stores the metadata in the file system at the lowest level.

Figure 6:
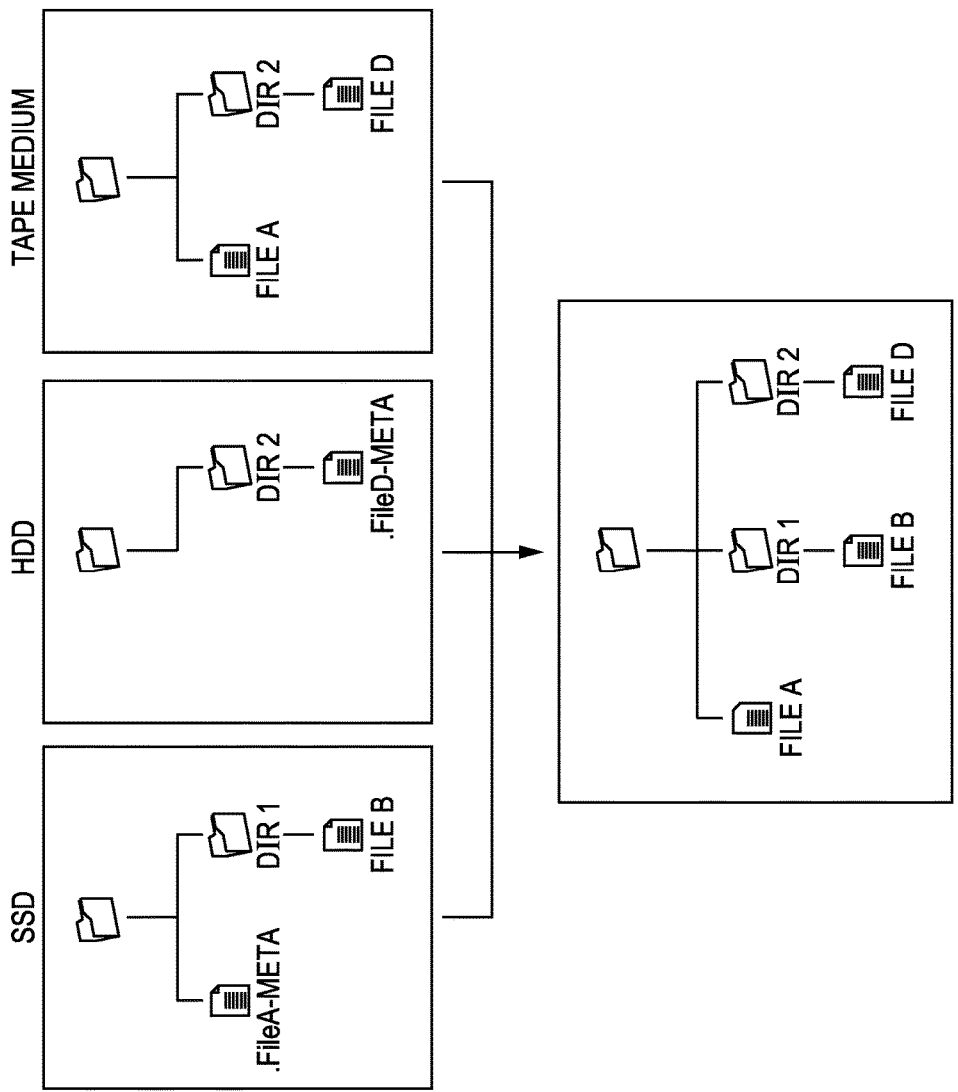
FIG. 6 is a diagram illustrating an example of metadata after migration, in accordance with an embodiment of the present invention.

The result of the process described above is shown in the upper part of FIG. 6. FIG. 6 is a diagram illustrating information retained by the file systems of the respective storage units. In this example, a file A and a file D are moved from the SSD 11 to the HDD 12 and from the HDD 12 to the tape medium 21. A file B is not moved from the SSD 11, the file A and the file D are moved from the SSD 11 to the HDD 12, and metadata that is not migratable is stored in a metafile having a file name ".FileA-meta" on the SSD 11. Here, data and migratable metadata in the file A having a file name "FileA" are moved, and only the remaining metadata is stored, and therefore, the file A is renamed ".FileA-meta" described above and is used as a metafile.

The file A and the file D are moved from the HDD 12 to the tape medium 21. The file D includes metadata that is not migratable to the tape medium 21, and therefore, the non-migratable metadata is stored on the HDD 12 in a metafile having a file name ".FileD-meta". The tape medium 21 stores the file A and the file D that have been moved from the SSD 11 via the HDD 12.

In a case where a user, an application, or the like attempts to refer to metadata of a file that has been moved as described above, all metafiles on all levels as well as the file are referred to, and the reference result is returned. For example, in a case where an attempt to refer to metadata of the file A is made, both the metafile in the file system of the SSD 11 and the file on the tape medium 21 are referred to, and all pieces of metadata are collected and returned as the reference result. It is possible to display the pieces of metadata on the display device, such as a display, for example, to thereby show them to a user. An illustration shown in the lower part of FIG. 6 is a diagram illustrating the result that is obtained by collecting pieces of metadata and that is returned.

In order to implement the above-described process, the information management system 30 may further include a collecting unit that, responsive to a request for obtaining metadata of a file, collects pieces of metadata of the file from the file systems at the respective levels in which they are stored. The information management system 30 may include, as needed, one or more functional units, such as a display unit that displays collected pieces of metadata and an accepting unit that accepts a request for obtaining metadata described above.

It is possible to prevent metadata from being lost when a file is moved beyond a file system by: distributing pieces of metadata of one file to file systems; causing the file systems to retain the pieces of metadata; collecting the distributed pieces of metadata for a user, an application, or the like; and returning the sum of the pieces of metadata as the result of collection.

For example, in a case where data in the file A on the tape medium 21 has been updated, metadata, such as an update date/time, is updated. The processing unit 33 updates metadata in metafiles stored in the file systems at the respective levels and metadata in the file in response to the update of the file. Metadata may include an EA, and information may be added to the EA. Therefore, in a case where metadata has been added, the metadata can be written and added to a metafile or to the file in the file system at a level to which the metadata can be stored. Specifically, when metadata has been added to a file, it is determined whether the metadata can be stored in the file systems at the respective levels, and the metadata can be stored in the file system at a lower level to which the metadata can be stored.

In a case where a file has been deleted, any metafile on any level which stores metadata of the file is deleted. In a case of renaming a file, that is, in a case of changing the file name of a file, the file name of any metafile on any level which stores metadata of the file is changed in order to keep consistency. For example, if a name of a file has been changed from "FileA" to "Filet", then a related part of a file name of any associated metafile is changed. For example, the file name ".FileA-meta" is changed to ".FileZ-meta". As a consequence, in a hierarchical storage system based on HSM or the like, it is possible to move a file beyond a file system without a loss of metadata. Note that the processing unit 33 may also perform the processes described above.

Writing, which is performed when metadata is stored, need not be performed in order from the file system of a storage unit on the highest level, and may be performed in order from the file system of a storage unit on the lowest level on which the data is present. The order for writing to the file systems is not limited to the above-described orders, and writing may be performed in an order other than the above-described orders. In a case of reading metadata, metadata may be read in order from the file system of a storage unit on the lowest level on which the data is present. However, it is desired that reading be performed from the file system of a storage unit on the highest level first, for which high-speed reading is possible. This is because metadata that has been read can be promptly processed. However, the order for reading is not limited to the above-described orders, and reading may also be performed in an order other than the above-described orders.

Although the above description is given while assuming that each storage unit is provided with one file system, one storage unit may be divided into plural storage areas, namely, partitions, and a file system may be structured for each partition. In a case where a file is moved among partitions, it is also possible to perform distributed management of metadata by using a method similar to that described above.

A movement target to which metadata is added and which is moved among file systems is not limited to a file, and may be a directory (folder) for classifying and organizing files, a symbolic link which is a file that indicates another file or a directory and with which the other file or the directory can be referred to, or the like.

Although the information management system, the information management method, and the program according to the present invention have been described above with reference to the drawings, other embodiments or modifications, such as additions, alterations, and deletions, are possible within a scope that can be conceived by those skilled in the art, and are included in the scope of the present invention as long as the effects of the present invention are attained in any aspect. Therefore, a recording medium in which the above-described program is recorded, a program providing server that provides the above-described program over a network or the like, and so on can be provided.

Embodiments of the present invention provide a system and a method for preventing metadata from being lost when a file or the like is moved. This system is a system for managing metadata of a file, a directory, or a symbolic link, the system including obtaining means for obtaining, in a case of moving at least one of a file, a directory, and a symbolic link, which is a movement target to be moved from one file system to another file system among a plurality of file systems, pieces of metadata of the movement target; determining means for referring to metadata stored in the other file system and determining whether the obtained pieces of metadata are migratable to the other file system; and processing means for, among the obtained pieces of metadata, migrating a piece of metadata that is determined to be migratable to the other file system, and leaving a piece of metadata that is determined to be non-migratable in the one file system.

The term "exemplary" means of or relating to an example and should not be construed to indicate that any particular embodiment is preferred relative to any other embodiment.

What is claimed is:

1. A method for managing metadata added to a file, a directory, or a symbolic link, the method comprising:
   obtaining, by one or more processors, a first piece of metadata of a movement target and a second piece of metadata of the movement target, wherein the first piece of metadata has a first metadata type and the second piece of metadata has a second metadata type, wherein the movement target is at least one of a file, a directory, and a symbolic link, wherein the movement target is to be moved from a first file system to a second file system within a plurality of file systems organized into hierarchal levels, wherein the first file system is on a first hierarchal level, wherein the second file system is on a second hierarchal level, and wherein the second hierarchal level lower the first hierarchal level;
   identifying a third piece of metadata on the second file system, wherein the third piece of metadata has a third metadata type;
   determining that the third metadata type is the same as the first metadata type and not the same as the second metadata type;
   identifying a fourth piece of metadata on a third file system that is on a third hierarchal level, wherein the forth piece of metadata has a fourth metadata type and wherein the third hierarchal level is higher than the second hierarchal level;
   determining that the fourth metadata type is the same as the second metadata type;
   determining that the third hierarchal level is the lowest hierarchal level with a file system that contains metadata that has the fourth metadata type;
   concluding, based on the determining that the third metadata type is the same as the first metadata type, that the first piece of metadata would not be lost in a migration of the first piece of metadata with the movement target;
   concluding, based on the determining that the third metadata type is not the same as the second metadata type, that the second piece of metadata would be lost in a migration of the second piece of metadata with the movement target;

concluding, based on the determining that the fourth metadata type is the same as the second metadata type, that the second piece of metadata would not be lost in a migration of the second piece of metadata to the third file system;

migrating, based on the concluding that the first piece of metadata would not be lost, the first piece of metadata with the movement target;

creating, based on the concluding that the second piece of metadata would be lost in a migration to the second file system, based on the concluding that the second piece of metadata would be not lost in a migration to the third file system, and based on the determining that the third hierarchal level is the lowest hierarchal level with a file system that contains metadata that has the fourth metadata type, a metafile in the third file system, wherein the metafile is a file that only stores metadata corresponding to movement targets that have been migrated to file systems other than the file system on which the metafile is located, and wherein the metafile is invisible to users of the file system; and preventing the second piece of metadata from being lost in a migration of the movement target, based on the concluding that the second piece of metadata would be lost, wherein the preventing comprises storing the second piece of metadata in the metafile in the third file system instead of migrating the second piece of metadata with the movement target to the second file system.

2. The method according to claim 1, wherein the plurality of file systems are arranged into a hierarchy, the method further comprising:

determining, when moving the movement target from a file system at a high level to a file system at a low level via one or more file systems at middle levels, for each piece of metadata of the one or more pieces of metadata of the movement target, whether the piece of metadata is migratable to file systems at each of one or more levels; and wherein processing the one or more pieces of metadata includes migrating the piece of metadata to a file system at a respective level to which the piece of metadata is migratable, each respective level being a level that is lower than the high level, thereby storing the one or more pieces of metadata in the file systems at the respective levels.

3. The method according to claim 2, further comprising:

generating a list identifying pieces of metadata of the one or more pieces of metadata that are not migratable to the file system at the low level; and migrating each piece of metadata of the list to a file system at a level that is lower than the high level and to which the piece of metadata is migratable.

4. The method according to claim 3, further comprising:

determining that each of the one or more pieces of metadata is migratable to the file system at the low level and, in response: migrating the one or more pieces of metadata to the file system at the low level and thereafter deleting the movement target from the file system at the high level.

5. The method according to claim 2, further comprising:

updating the one or more pieces of metadata of the movement target which are stored in the file systems at the respective levels in response to an update of the movement target.

6. The method according to claim 2, further comprising, in response to addition of an additional piece of metadata to the movement target:

determining whether the additional piece of metadata is storable in the file systems at the respective levels; and storing the additional piece of metadata in a file system at a lowest level in which the piece of metadata is storable.

7. The method according to claim 2, further comprising:

changing, in response to a change in a name of the movement target, file names of metafiles in the file systems at the respective levels, the metafiles storing the one or more pieces of metadata of the movement target.

8. The method according to claim 2, further comprising:

deleting, in response to deletion of the movement target, all of the one or more pieces of metadata of the movement target which are stored in the file systems at the respective levels.

9. The method according to claim 2, further comprising:

collecting the one or more pieces of metadata of the movement target which are stored in the file systems at the respective levels, in response to a request for obtaining the pieces of metadata of the movement target.

10. The method according to claim 1, wherein the third file system is the first file system and wherein the third hierarchal level is the first hierarchal level.

11. The method according to claim 10, wherein the fourth piece of metadata is the second piece of metadata.

* * * * *